Aug. 17, 1965   R. R. WAMPLER   3,201,167
GRIPPING CLAMP
Filed Aug. 9, 1963   2 Sheets-Sheet 1
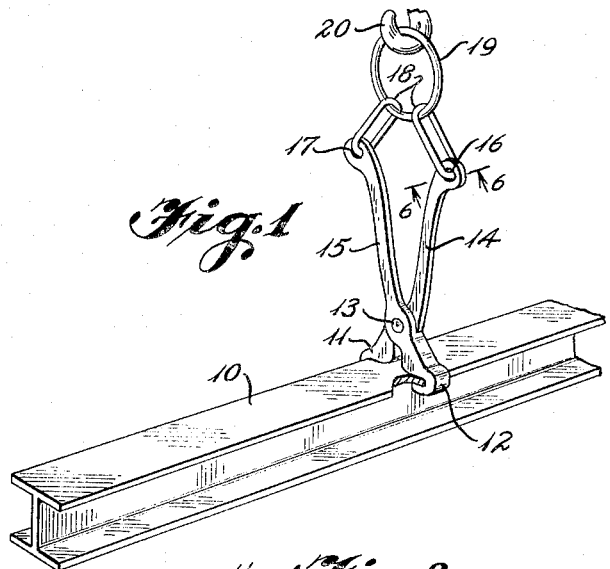
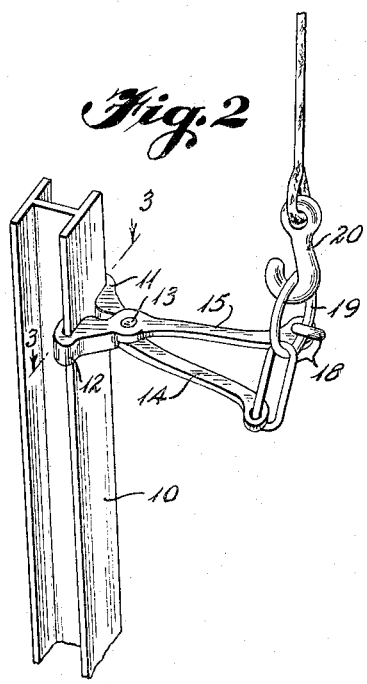
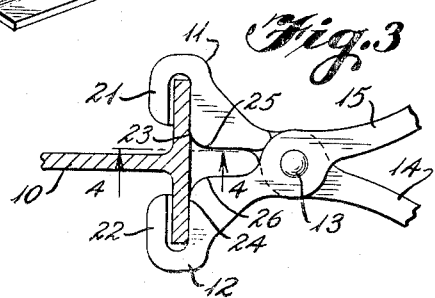
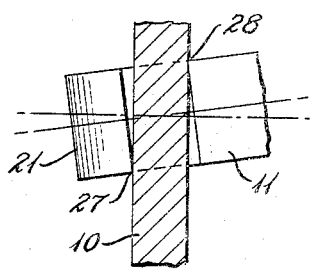
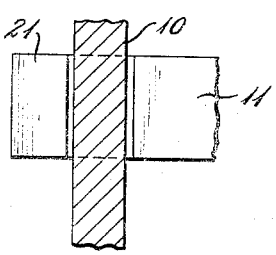
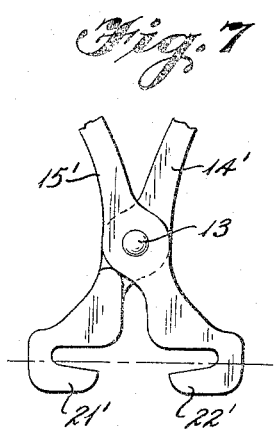
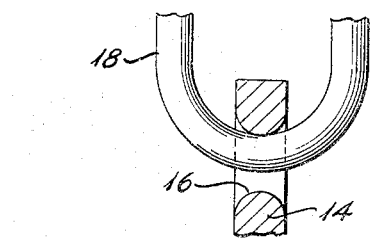
INVENTOR
Robert R. Wampler
BY
Ayates Dowell I & II
ATTORNEY

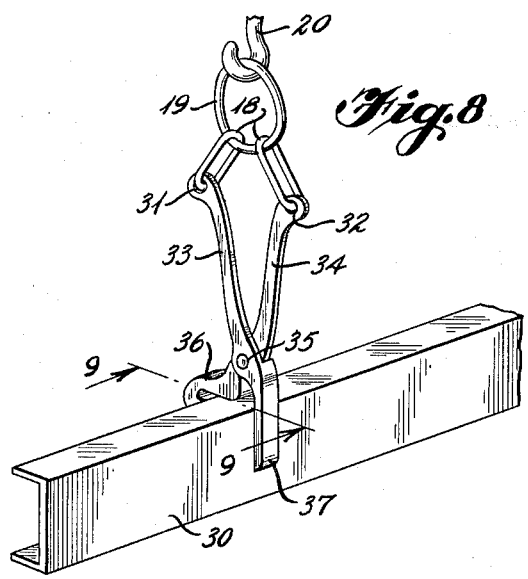
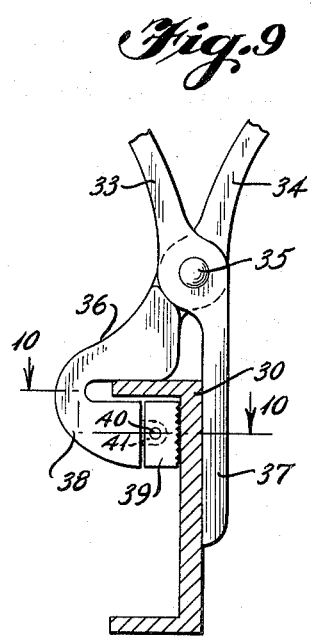
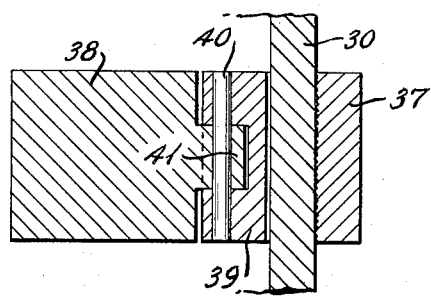
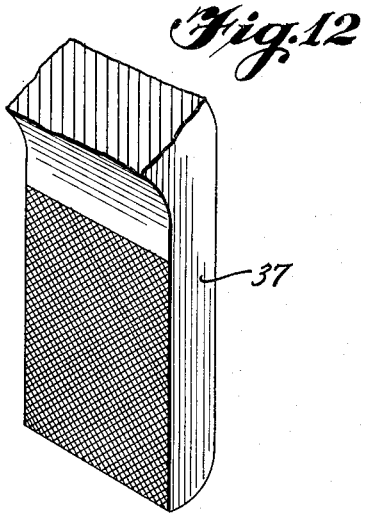
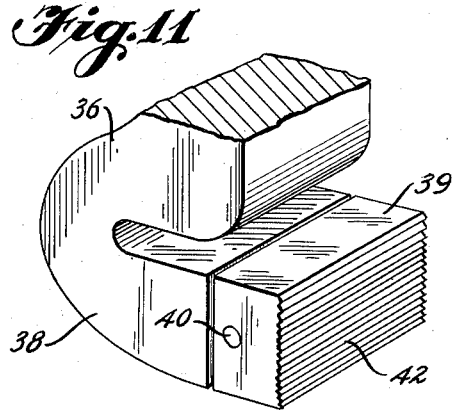

United States Patent Office 3,201,167
Patented Aug. 17, 1965

3,201,167
GRIPPING CLAMP
Robert R. Wampler, 5712 Pollock Ave.,
Evansville 15, Ind.
Filed Aug. 9, 1963, Ser. No. 301,055
4 Claims. (Cl. 294—118)

This invention relates to the handling, transportation and use of commodities of various kinds, sizes, shapes and weights including standard structural shapes of steel and other relatively heavy bodies by means of mechanical lifting and moving devices of well known construction.

The invention relates particularly to devices used in the handling of structural shapes of steel and other objects of various fabricated shapes and sizes such as plates, angles, channels, beams, columns, trusses and the like including during fabrication, unloading, erection and thereafter of structures of various kinds.

Prior material handling devices have not been satisfactory because they were not safe to use because at least they did not provide positive reliable gripping of the various members engaged but allowed slipping, sliding, kinking and other damaging thus creating great hazards and lacking safeguards to persons and property including not only those employed but others in the vicinity. Such prior devices have included cables with eyes attached to the opposite ends and generally referred to as chokers which it has been customary to loop around members to be lifted. Use of these chokers or cables did not provide sufficient and broad enough contact to prevent the members to which they were applied from slipping or from being released and sometimes long beams would be caused to buckle, bend or twist because of the manner of engagement thereof. The way of handling objects of the character of structural shapes frequently caused damage to the articles handled, were dangerous to personnel and resulted in waste of time, labor and materials.

It is an object of the invention to provide material handling means including a gripping clamp of maximum positive engagement and continued gripping action for use in the handling of materials of standard structural or other shapes, or when applied to existing structures for attaching mechanical means to install, remove, elevate, or otherwise move members or apply force and which thereby will afford maximum safety for the workmen and other personnel and which will not cause damage to material or equipment.

A further object of the invention is to provide a gripping clamp by means of which standard structural shapes and other articles may be safely, easily, and expeditiously handled without injury to person or property resulting in a substantial saving in the use thereof including in the facilitation of erection and in insuring improved construction.

Other objects and advantages of the invention will be apparent from the following description taken in conjunction with the accompanying drawings in which:

FIG. 1 is a perspective illustrating one use of the invention;

FIG. 2, a perspective illustrating the vertical lifting of a beam;

FIG. 3, a fragmentary section along the line 3—3 of FIG. 2;

FIGS. 4 and 5, enlarged detail views taken along the lines 4—4 of FIG. 3 illustrating the engagement of the parts respectively under stress and devoid of stress;

FIG. 6, an enlarged fragmentary detail view of the link and eye connection of FIG. 2;

FIG. 7, a fragmentary elevation of a gripping clamp of modified construction;

FIG. 8, a perspective illustrating the attachment of a further modified gripping clamp to a channel member;

FIG. 9, an enlarged fragmentary side elevation of the head of the clamp along the line 9—9 of FIG. 8 with the channel in section;

FIG. 10, a fragmentary section on the line 10—10 of FIG. 9;

FIG. 11, an enlarged perspective of the gripping jaw with swivel head; and

FIG. 12, a fragmentary perspective of the longitudinal leg of the clamp.

Briefly stated the invention constitutes substantially to safety and protection of life and property as well as to more satisfactory and efficient operation due to its construction. Material handling clamps have been used of generally scissor-like construction with pivoted members having levers or handles connected by links to a ring carried on the bottom of a crane or the like so that weight tends to move the operating handles or levers toward each other to cause similar movement of clamping jaws at the remote ends thereof at the opposite side of the pivot, such clamping jaws providing a gripping clamp having receiving openings complementary to the specific portion of the structural shape to be engaged and gripped. The jaws of the gripping clamp of the present invention have end portions turned toward each other providing receiving openings each of which is of a configuration corresponding substantially in shape to that of the exterior of the object to be received and held. These opposed jaws are of a shape not only to receive but to have substantial area of contact with the object, and with opposite edges of each jaw gripping the object so that it cannot slide or be released, and the area contact with the object is so broad that a relatively large object may be gripped and held from near one end and thus avoid bending and kinking as sometimes happens when a relatively long beam is gripped at its center.

With continued reference to the drawings the invention is adapted to be used for example in connection with an I-beam 10, or other structural shapes including channels, columns or the like having opposite portions which can be engaged by a material handling clamp. Also it can be applied to existing structures for attaching mechanical means to install, remove, raise or otherwise move, apply force or anchor objects of various kinds.

In the fabrication, transportation and utilization of these structural shapes the handling of the same as well as attachment to existing structures presents a problem primarily due to weight, shape and size, especially of relatively long length, and accordingly such handling is dangerous, difficult, time-consuming and expensive.

In order to simplify the handling of structural shapes an improved type of clamp is employed, such gripping clamp comprising opposed relatively wide jaws 11 and 12 connected by a pivot 13 and with operating arms or levers 14 and 15 having remote ends provided with openings 16 and 17 in which are located links 18 engaged by a ring 19 which can be attached by a support such as a crane-mounted hook 20. When the jaws 11 and 12 are attached to an I-beam or other object and carry the weight thereof downward force is exerted on the links 18, carried by the ring 19 on the hook 20, causing the operating arms or levers 14 and 15 to move toward each other causing the jaws 11 and 12 to clampingly engage and hold an object.

The jaws 11 and 12 which form the head of the gripping clamp include a flattened portion reversely turned end portions 21 and 22 with inner surfaces providing receiving openings generally of a configuration corresponding to the shape of the object engaged. The end portions 21 and 22 are generally parallel with the flattened portions of the jaws 11 and 12 respectively and provide opposed shoulders which frictionally engage the object when the object is being raised. In other words, each receiving opening is of a shape substantially complementary to the portion of the object received. On account of the distance between the object and the pivot 13 and the proximity of the two jaws one to the other an object too narrow or one too broad cannot be clampingly received. In other words, if the flange of the I-beam is too wide the jaws will have to be moved further apart on their connecting pivot 13 and out of alignment so that surfaces 23 and 24 become obstructing shoulders which do not permit the receiving of the opposite edges of the I-beam or other object being handled. If the I-beam were sufficiently small that the opposed flanges were too closely spaced the parallel portions 25 and 26 would abut and at the same time the inner edges of the inturned ends 21 and 22 would likewise obstruct the opposite portions of the I-beam or other object.

In FIGS. 4 and 5 there are disclosed enlarged detail fragmentary views illustrating the actual gripping of the jaw with biting action in the areas 27 and 28 between the portions of the jaw and the flange of the beam 10. FIG. 5 is an enlarged fragmentary view similar to FIG. 4 but without strain on the jaw. In FIG. 6 there is disclosed the rounded nature of the opening 16 in the operating arm 14 so that the curve of the link 18 may move freely in the arm and not be damaged thereby.

In FIG. 7 there is disclosed a slightly modified form of clamp from that of FIG. 3 in which the inturned portions 21' and 22' provide a slightly tapered or outwardly enlarged jaw-receiving opening instead of openings with opposed parallel faces. This allows the clamp to be applied to a somewhat stockier beam or a beam in which the flange tapers slightly from its free edge to its mounting portion thus providing a positive gripping action.

In FIGS. 8 to 12 a clamp is provided to accommodate a channel iron 30 having opposed flanges. In this construction a ring 19 corresponding to that of the preceding figures carries links 18 which extend through openings 31 and 32 of operating arms 33 and 34 of a gripping or material handling clamp. The arms 33 and 34 are connected by a pivot 35 on the remote side of which are a pair of members one of which may be described as a jaw 36 generally similar to the jaws of the preceding embodiment illustrated and described, and an opposed object-engaging member 37 having a generally straight flat surface, such member forming in effect a supporting leg for the flat surface of the channel member remote from the flanges thereof.

The jaw 36 has a reversely or inturned portion 38 providing a receiving space with opposite generally parallel faces into which the flange of the channel member 30 can be received. In order to accommodate channel members having greater web thickness an adjusting head 39 is provided mounted by means of a pivot 40 in a lug 41 of the portion 38 of the jaw and due to the pivotal mounting the jaw automatically will adjust itself to the web of the channel member. To improve the contraction and gripping action the face 42 of the adjusting head 39 may be serrated or roughened. Also to improve frictional contact between the inner surface of the supporting leg 37 and the channel member such inner surface of the leg likewise is knurled or roughened.

When it is desired to apply a gripping clamp of the character indicated in FIGS. 1 and 7 to a structural shape such as an I-beam the opposite jaws of the clamp are spread sufficiently so that they can be applied to the beam or other object whereupon force between the ring and the beam will cause the links 18 to produce movement of the legs to which the jaws are attached to contract the jaws and clamp the object to which the clamp is applied and due to the specific jaw structure of the clamp both objects can be accomplished readily, quickly and with safety to persons and without damage to the beams or other objects moved or to property. When the structural member is raised out of engagement with the ground or other supporting surface the major portion of the weight of the member will gravitate downwardly and will tend to slip out of the jaws. Due to the width of the jaws and the size of the receiving openings, the opposite edges of the jaws will frictionally engage or clamp the structural member and prevent longitudinal movement thereof. When it is desired to release the beam or other object moved relieving the tension as by allowing the object to rest on a solid support will cause the clamps to become detached or will make it possible easily to detach the same.

The clamp of FIGS. 8 to 12 can be applied and removed in like manner by applying the relatively straight supporting leg 37 on the side of the channel web opposite the flanges and by applying the jaw 36 about one of the flanges so that the head 39 accommodates itself to the surface of the remote side of the web from the supporting leg 37 to grip the web between such surfaces.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A material handling clamp comprising a pair of leverage members pivotally connected intermediate their ends, said members having inwardly opposed relatively wide gripping jaws on one end, link means pivotally connected to the opposite ends of said members, means for connecting said link means to apply force to said leverage members and move said gripping jaws toward each other, at least one of said jaws having an elongated generally planar guiding portion disposed generally radially with regard to said pivotal connection, an arcuate camming surface at the end of said planar portion remote from said pivotal connection, said arcuate camming surface terminating in an elongated substantially U-shaped recess extending outwardly generally at a right angle to said planar portion and having a depth substantially greater than the distance across the mouth of the recess when measured along a line extending radially of said pivotal connection, whereby the flange of a structural member may be slidingly engaged by said planar portion and guided into a position to be gripped by said jaws.

2. The structure of claim 1 in which each of said jaws includes a generally planar portion with an arcuate camming surface connecting said planar portion to a substantially U-shaped recess.

3. The structure of claim 1 in which the other of said jaws includes an elongated generally radial portion in opposed relation to said one jaw.

4. The structure of claim 1 in which said jaws are substantially wider than said leverage members.

References Cited by the Examiner

UNITED STATES PATENTS

| | | | |
|---|---|---|---|
| 795,089 | 7/05 | Auer | 294—116 |
| 894,259 | 7/08 | Collins | 294—116 |
| 1,814,107 | 7/31 | Zavatkay | 294—118 X |
| 1,972,583 | 9/34 | Cullen | 294—118 |
| 2,324,361 | 7/43 | Chandler | 294—104 |
| 2,788,237 | 4/57 | Misiura | 294—106 X |
| 2,866,248 | 12/58 | Reno | 294—104 X |

SAMUEL F. COLEMAN, *Primary Examiner.*

ERNEST A. FALLER, *Examiner.*